United States Patent
Zunke et al.

(10) Patent No.: US 11,706,310 B2
(45) Date of Patent: Jul. 18, 2023

(54) SYSTEM AND METHOD FOR ADAPTING A RESPONSE PROVIDED BY A FIRST DEVICE

(71) Applicant: THALES DIS CPL USA, INC., Austin, TX (US)

(72) Inventors: Michael Zunke, Kirchheim (DE); Werner Dondl, Markt Schwaben (DE); Alexandre Airvault, Munich (DE)

(73) Assignee: THALES DIS CPL USA, INC., Austin, TX (US)

( * ) Notice: Subject to any disclaimer, the term of this patent is extended or adjusted under 35 U.S.C. 154(b) by 0 days.

(21) Appl. No.: 15/909,341

(22) Filed: Mar. 1, 2018

(65) Prior Publication Data
US 2019/0273795 A1    Sep. 5, 2019

(51) Int. Cl.
*G06F 15/16* (2006.01)
*H04L 67/565* (2022.01)
(Continued)

(52) U.S. Cl.
CPC ............ *H04L 67/565* (2022.05); *G06F 9/547* (2013.01); *G06F 13/10* (2013.01);
(Continued)

(58) Field of Classification Search
CPC ............ H04L 67/2828; H04L 41/0609; H04L 67/2823; H04L 63/102; H04L 12/1813;
(Continued)

(56) References Cited

U.S. PATENT DOCUMENTS

| | | | |
|---|---|---|---|
| 7,748,027 B2* | 6/2010 | Patrick ................ | G06F 21/6209 709/227 |
| 10,701,079 B1* | 6/2020 | Ledet .................... | H04L 63/102 |

(Continued)

FOREIGN PATENT DOCUMENTS

WO    02/05185 A1    1/2002

OTHER PUBLICATIONS

A. Singh, A. Trivedi, K. Ramamritham and P. Shenoy, "PTC : proxies that transcode and cache in heterogeneous web client environments," Proceedings of the Third International Conference on Web Information Systems Engineering, 2002. WISE 2002., Singapore, 2002, pp. 11-20 (Year: 2002).*

(Continued)

*Primary Examiner* — Oscar A Louie
*Assistant Examiner* — Messeret F Gebre

(57) ABSTRACT

The invention relates to a system and a method for adapting a response provided by a first device. The system comprises the first device with means for receiving from at least one client device, as at least one second device, a data access request comprising at least one client identifier and a predetermined application programming interface or service provider interface associated with the first device. The first device comprises means for processing the data access request that provides the response to the data access request and means for sending the response. The system comprises adapting means for intercepting and adapting the response sent by the first device. The adapting means adapts the response while being specific to the client and provides an adapted response. And the system comprises adapted response sending means for sending at least a part of the adapted response to the second or a third device(s).

11 Claims, 2 Drawing Sheets

(51) Int. Cl.

| | | |
|---|---|---|
| *G06F 21/73* | (2013.01) | |
| *G06Q 30/0283* | (2023.01) | |
| *H04L 67/02* | (2022.01) | |
| *G06F 9/54* | (2006.01) | |
| *G06F 21/62* | (2013.01) | |
| *G06F 16/9535* | (2019.01) | |
| *G06F 13/10* | (2006.01) | |
| *H04L 67/306* | (2022.01) | |
| *H04L 67/01* | (2022.01) | |

(52) U.S. Cl.
CPC .......... *G06F 16/9535* (2019.01); *G06F 21/62* (2013.01); *G06F 21/73* (2013.01); *G06Q 30/0283* (2013.01); *H04L 67/01* (2022.05); *H04L 67/02* (2013.01); *H04L 67/306* (2013.01)

(58) Field of Classification Search
CPC ... H04L 65/4015; H04L 67/306; H04L 67/02; H04L 67/42; G06F 16/9535; G06F 16/9536; G06F 16/9538; G06F 2221/2141; G06F 9/547; G06F 13/10; G06F 21/62; G06F 21/73; G06Q 40/02; G06Q 30/0283
USPC .................................................. 709/224, 246
See application file for complete search history.

(56) References Cited

U.S. PATENT DOCUMENTS

| | | | |
|---|---|---|---|
| 2001/0037359 A1 | 11/2001 | Mockett et al. | |
| 2008/0072306 A1* | 3/2008 | Krasnoiarov | H04L 63/0227 726/12 |
| 2008/0139191 A1* | 6/2008 | Melnyk | G06F 16/9577 455/419 |
| 2009/0094561 A1* | 4/2009 | Do | G06F 3/0425 715/863 |
| 2009/0144282 A1* | 6/2009 | Uramoto | G06F 21/6218 |
| 2010/0024184 A1 | 2/2010 | Kitami | |
| 2010/0218253 A1* | 8/2010 | Sutton | G06F 21/554 726/23 |
| 2010/0241844 A1* | 9/2010 | Hussain | G06F 21/6218 713/150 |
| 2010/0250341 A1 | 9/2010 | Hauser | |
| 2012/0259826 A1* | 10/2012 | Zalila-Wenkstern | G06F 16/954 707/706 |
| 2014/0298037 A1* | 10/2014 | Xiao | H04L 9/3273 713/181 |
| 2015/0186635 A1* | 7/2015 | Nakhjiri | H04L 69/22 726/17 |
| 2015/0348106 A1* | 12/2015 | Yao | G06Q 30/0256 705/14.54 |
| 2016/0179838 A1* | 6/2016 | Mavinakuli | G06F 16/176 707/618 |
| 2017/0118267 A1* | 4/2017 | Philippov | H04L 67/02 |
| 2017/0132401 A1* | 5/2017 | Gopi | G06F 21/6227 |
| 2017/0272816 A1 | 9/2017 | Olds | |
| 2022/0198041 A1* | 6/2022 | Wilczynski | H04L 63/20 |

OTHER PUBLICATIONS

C. Angerer and T. Gross, "Model and Architecture of a Timing Service for Adaptive Policy-Based Management Systems," Proceedings IEEE INFOCOM 2006. 25th IEEE International Conference on Computer Communications, Barcelona, Spain, 2006, pp. 1-9 (Year: 2006).*

Z. Meng, J. Qiao and L. Zhang, "Design and Implementation: Adaptive Active Queue Management Algorithm Based on Neural Network," 2014 Tenth International Conference on Computational Intelligence and Security, Kunming, China, 2014, pp. 104-108 (Year: 2014).*

Notification of Transmittal of the International Search Report and the Written Opinion of the International Searching Authority (Forms PCT/ISA/220, PCT/ISA/210, and PCT/ISA/237) dated May 17, 2019, in corresponding International Application No. PCT/EP2019/054408. (16 pages).

Examination Report from European Patent Office for co-pending patent Application N° C. 19706993.3 dated Aug. 24, 2022.

* cited by examiner

SYSTEM AND METHOD FOR ADAPTING A RESPONSE PROVIDED BY A FIRST DEVICE

FIELD OF THE INVENTION

The present invention relates generally to a system and a method for adapting a response provided by a first device.

The first device may be a server.

The present invention is notably applicable to a field in which a client device(s), as a second device(s), include(s) e.g., a Personal Computer (or PC), a mobile (tele)phone, an Internet Of Things (or IoT) device, a Secure Element (or SE) and/or any other computing device.

Within the present description, an SE is a smart object that includes a chip(s) that protect(s), as a tamper resistant component(s), access to stored data and that is intended to communicate data with a device(s), like e.g., an SE host device and/or an SE user.

STATE OF THE ART

It is known that a client device sends to a (web) server, like e.g., a weather forecast provider for a given location, a request for accessing weather forecast in Munich, as data. The data access request comprises a client identifier and a predefined Application Programming Interface (or API). The API is referenced with an API endpoint(s) that may be (each) accessed by a client(s). The server processes the data access request based on an accessed API endpoint and determines a corresponding response, like e.g., a temperature in Munich, to the data access request. Then, the server sends the response to the client device.

However, to provide another client with a different response, that is e.g., humidity only i.e. without any other information, like the temperature, such as a response with precise humidity for a given precise location, like e.g., Munich, the (web) service has to be modified and a new corresponding API endpoint is necessary to issue the concerned different response to the client. It is needed to develop a new corresponding service and provide a new corresponding API endpoint, so as to issue the different response.

There is a need of an alternative solution without needing to modify the (original) service and the associated API endpoint(s) (creation/management/maintenance).

SUMMARY OF THE INVENTION

The invention proposes a solution for satisfying the just herein above specified need by providing a system for adapting a response provided by a first device.

According to the invention, the system comprises the first device. The first device comprises means for receiving from at least one client device, as at least one second device, a data access request. The data access request comprises at least one identifier relating to a client and a predetermined application programming interface or a predetermined service provider interface. The predetermined application programming interface or the predetermined service provider interface is associated with the first device. The first device comprises means for processing the data access request. The data access request processing means provides the response to the data access request. The first device comprises means for sending the response. The system further comprises adapting means for intercepting and adapting the response sent by the first device. The adapting means adapts the response while being specific to the client. The adapting means provides an adapted response. And the system further comprises adapted response sending means for sending at least a part of the adapted response. The adapted response sending means sends the at least part of the adapted response to the second device or at least one third device.

The principle of the invention consists in using a system that captures a response issued by a first device and that is the response to a data access request that is sent from a second and client device and processed by the first device. The system comprises the first device that contains means for receiving the data access request, means for processing the data access request and means for sending the response. The data access request comprises a client identifier and a predefined API or Service Provider Interface (or SPI). The API or SPI allows addressing a corresponding first device service. The system allows modifying or adapting the response to the concerned client.

It is to be noted that the adapted response to the data access request can comprise an (original) data response provided by the first device or a data response that is modified by removing some information from the data response and/or changing the representation or format of the data response (like e.g., non licensed data, modifying the (original) data response granularity, data representing less precision than the (original) data response, limiting and/or anonymizing a dataset). The adapted response can include a measurement of the original data response transmitted to the client and that is possibly modified with respect to the original data response. The measurement relating to the adapted (data) response may include a monetary value relating to the adapted response. The adapted response may include additional information, like e.g., date/time/history of requests/additional dependency entitlements. The adapted response may include external or internal information to be used for measuring a perceived value of the response for a given client.

The system allows transmitting the adapted response in part, as a data subset, or in full, as a complete data set, to the client device or a third device(s) that is(are) separate from the client device.

The invention solution relies thus on a first device response adaptation system. Contrary to the aforementioned prior art solution, the invention solution allows using one and the same first device while being able to provide the concerned client device or (an)other device(s) with a partial or complete adapted response.

The adapted response may include at least in part the response or the response that has been previously modified and/or measured in a manner dependent on at least the client.

The invention solution allows providing a plurality of (data) responses that are adapted to their respective clients while being possibly separate from each other.

The invention solution allows decoupling the engineering work required to provide the data responses from the work required to achieve different offerings (or data responses) through different adapted (data) responses (or packaging), i.e. adapting the (original) (data) response to reflect (or generate) the client specific offering (or data response). In other words, the invention solution allows processing the provided original (data) response to personalize the response given to the client without needing to re-develop some application instructions (or code) to be executed by the first device.

The invention solution allows the introduction of new data response(s) without needing to introduce any new API endpoint. Thus, if any additional data resource has to be added and consumed by a client(s), the additional data resource(s) can be included in the existing API without developing any additional API endpoint. For compatibility to previous clients, the adaptation can take place in response adaptation to reflect the previous format of the adapted (data) response that may be the previous original (data) response.

The invention solution allows the owner of the first device (or on its behalf) to decide, at any time, whether an original (data) response needs (or not) to be filtered out (e.g. for a privacy reason, any other security related concern or rule (such as General Data Protection Regulation)). Thus, there is no need to develop any new API endpoint that does not provide the original response(s) for which there is a security related concern or rule to be satisfied. Such a response adaptation flexibility can be achieved on a per client basis, by e.g., allowing to use a client specific measurement scheme, that best fits a business agreement between the data response provider and the client.

The invention solution offers a single service to allow issuing a part or complete adapted response without needing to change corresponding program instructions (or code) and therefore without needing to involve one or several engineers to develop a corresponding service.

Thus, there is no need to re-develop any new corresponding service and therefore no need to provide any new API or SPI associated herewith. Accordingly, the invention solution does not require to create, change, manage and maintain in parallel several API endpoints and/or services and ensure backwards compatibility over time that constitutes long and complicated operations.

According to an additional aspect, the invention is a method for adapting a response provided by a first device.

According to the invention, the method comprises. Receiving, by the first device, from at least one client device, as at least one second device, a data access request. The data access request comprises at least one identifier relating to a client and a predetermined application programming interface or a predetermined service provider interface. The predetermined application programming interface or the predetermined service provider interface is associated with the first device. Processing, by the first device, the data access request. The data access request processing means provides the response to the data access request. Sending, by the first device, the response. Intercepting and adapting the response sent by the first device. Adapting the response while being specific to the client and providing an adapted response. And sending at least a part of the adapted response to the second device or at least one third device.

BRIEF DESCRIPTION OF THE DRAWINGS

Additional features and advantages of the invention will be apparent from a detailed description of one preferred embodiment of the invention, given as an indicative and non-limitative example, in conjunction with the following drawings.

DETAILED DESCRIPTION

Herein under is considered an exemplary embodiment in which the invention method for adapting a response provided by a remote server is implemented by the server and notably a module that is connected to a server output and is configured to intercept and adapt the response originating from the server in a manner that is specific to a client (device) having sent a request for accessing data to the server.

According to another exemplary embodiment (not represented), the invention method for adapting a response provided by a local server is implemented notably by the server and an SE embedded within or connected to the server. According to such an embodiment, the SE, as a local device, is adapted to perform the functions that are carried out by the module and described herein below while enhancing the security of stored and/or processed data.

The SE may be an incorporated chip, as a chip soldered, possibly in a removable manner, like e.g., an embedded SE, a Trusted Execution Environment (or TEE), as a secure area of a PC processor and a secured runtime environment, an embedded Universal Integrated Circuit Card (or eUICC) or an integrated Universal Integrated Circuit Card (or iUICC), on a Printed Circuit Board (or PCB) of the SE host device, or a chip that is coupled to a host device and included within a Universal Serial Bus (or USB), a smart card or any other medium (that may have different form factors), as an SE host device. The chip may thus be fixed to or removable from its host device, like e.g., the PC (or a mobile phone).

The invention does not impose any constraint as to a kind of the SE type.

Naturally, the herein below described embodiment is only for exemplifying purposes and is not considered to reduce the scope of the present invention.

Figure 1:
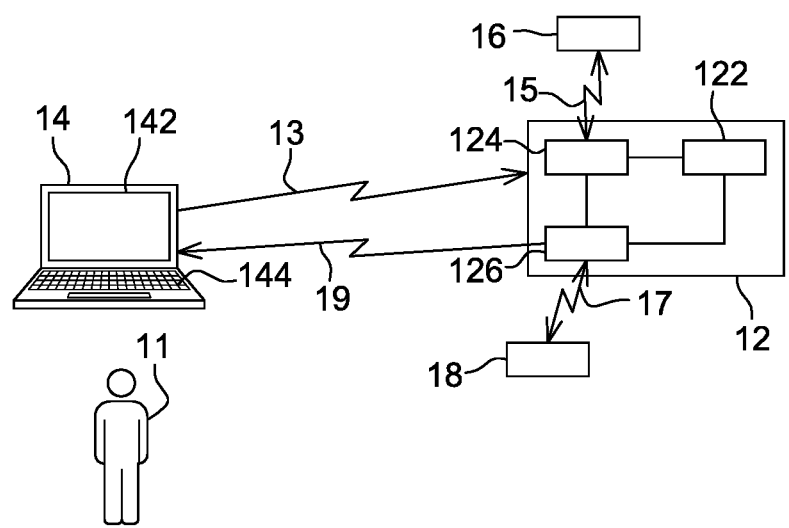
FIG. 1 illustrates a simplified diagram with a PC, as a client device, that is able to send to a server a request for accessing data, and an exemplary embodiment of a system comprising the server and at least one module connected hereto, the module being configured to adapt, based on the client, a response provided by the server and send the adapted response (or an adapted response part) to the PC and/or (an)other device(s), according to the invention.

FIG. 1 shows schematically a user 11, a system 12, a PC 14, as a client device, a first 16 and a second 18 entity both connected to the system 12.

For the sake of simplicity, only one user 11 and only one PC 14 have been represented at the client side.

However, the invention is applicable when the system 12 manages a set of clients (i.e. a user and/or an application supported by the client device) that may, each, use one or several client devices, at the client side.

Each client may be a user (human), a machine or any device, such as an Internet Of Things (or IoT) type device.

The client may desire to access data by requesting access to the concerned data, so as to consume or use the concerned requested data.

The clients are registered at a server 122 side within a client database. The client database associates client rights or one or several entitlements to each (identified) client.

The client entitlement(s) may include one or several allowed data operations that follow:
a data reading at least in part;
a data update at least in part;
a data sharing at least in part.

Such a data operation set is given as a mere example and is therefore not exhaustive.

The server 122 allows providing a response to a request for accessing data, as a data access request. The data access request originates from a client device, such as the PC 14.

The requested data may include information that is sensitive from a client perspective, like e.g., a credit card number, a social security number and/or a key(s), binary data, human readable data and/or a source code(s) (or program instruction(s)). Such a data set is given as a mere example and is therefore not exhaustive.

Instead of being constituted by a PC 14, the client device may be constituted by e.g., a smart phone, a vehicle, a virtual reality device, an augmented reality device, an IoT type device, a set-top box, a tablet computer, a desktop computer, a laptop computer, a video player, an audio player, a media-player, a game console, a netbook, a Personal Digital Assistant (or PDA) and/or any other computer device. Such a set of devices is given as mere device examples that may be used without being exhaustive.

Instead of being constituted by a physical device, a software component, such as a library, or a hardware component included within or connected to the device carries out the functions that are described infra and that are performed by the PC 14.

The PC 14 includes one or several Central Processing Unit(s) (or CPU), (micro)processor(s) and/or (micro)controller(s) (not represented), as data processing means, one or several memories (not represented), as data storing means, and one or several Input/Output (or I/O) interfaces (not represented).

The (or each) PC processor processes data originating from and/or intended to any internal component and data originating from and/or intended to any external device through one or several PC I/O interfaces.

The PC memories may include one or several EEPROMs (acronym for "Electrically Erasable Programmable Read-Only Memory"), one or several ROMs (acronym for "Read Only Memory"), one or several Flash memories and/or any other memories of different types, like e.g., one or several RAMs (acronym for "Random Access Memory").

A PC memory (and/or a memory of another device connected or coupled to the PC 14) stores preferably an Internet Protocol (or IP) address, as a PC 14 IDentifier (or ID), and/or other data that allow(s) uniquely identifying the PC 14.

The PC I/O interface(s) may comprise (and/or be connected to) a display screen 142 and a keyboard 144, as a PC Man Machine Interface (or MMI), so as to interact with the user 11.

The PC I/O interface(s) may include e.g. a camera(s) (not represented), so as to capture a video (or picture) signal(s) that is(are) included in a (local) environment or context that is present in front of the PC camera.

The PC I/O interface(s) may include e.g., an antenna (not represented), allowing to transmit data, through e.g., a wireless link 13, via one (communication) network(s), such as Intranet and/or Internet, to the server 122.

The PC 14 is connected, through the link 13, be it wire or wireless, to the server 122.

The channel using the link 13 may be secure or unsecure. The channel may be related to a HyperText Transfer Protocol (or HTTP) (registered trademark) type channel, an HTTP Secure (or HTTPS) type channel, a RESTful API communication or any other data communication channel.

Instead of being constituted by a remote (computing) server, the first device may be comprised in e.g., a smart phone, a PC, a vehicle, a virtual reality device, an augmented reality device, an IoT type device, a set-top box, a tablet computer, a desktop computer, a laptop computer, a video player, an audio player, a media-player, a game console, a netbook, a PDA and/or any other computer device. Such a first device set is given as a mere example that may be used without being exhaustive.

Instead of being constituted by a physical server, it may be constituted by a software component, such as a library, or a hardware component included in (or connected to) the device carries out the functions that are described infra and that are performed by the server 122.

The server 122 is remote and accessible through possibly one, two or more communication networks, such as an Intranet network and/or an Internet network, that allow to define or form a corresponding communication channel.

According to an alternative embodiment (not represented), the server 122 or a software component is local. For example, the server 122 is embedded within a device (not represented), such as an SE that is connected or communicatively coupled to the PC 14.

The server 122 is preferably accessed through an associated Application Provider Interface (or API) or a Service Provider Interface (or SPI).

The server 122 may be operated or managed by a Mobile Network Operator (or MNO), a Mobile Virtual Network Operator (or MVNO), a banking Operator, a wire communication network operator, a service Operator (or administrator) or on behalf of a service Operator, as a service provider.

The server 122 includes one or several CPU(s), (micro) processor(s) and/or (micro)controller(s), as data processing means (not represented), one or several memories, as data storing means (not represented), and one or several I/O interfaces (not represented) that are internally together connected.

The (or each) server processor processes data originating from and/or intended to any internal component and data originating from and/or intended to any external device through one or several server I/O interfaces.

The server I/O interface(s) is(are) used for communicating with an external device(s), such as the system 12, so as to provide, through the system 12, an adapted response that replaces a response to a data access request.

The server memory(ies) store(s) preferably, besides an OS, one or several applications to be executed, so that the server 122 provides one or several corresponding services.

The server 122 includes means for receiving from a client device(s) one or several data access requests. Each data access request includes one or several identifiers of the concerned client and a predetermined API or SPI. The (predetermined) API or SPI is associated with the server 122.

The server 122, as a data access request processor, processes each data access request and provides a response to the data access request. The server 122 provides one or several services.

The server 122 includes means for sending the response intended to the client device.

The system 12 includes the server 122.

The system 12 includes preferably a (request) filtering module 124.

The filtering module 124 is connected to the server 122.

The filtering module 124 may be present in a location that is separate from a location of the server 122.

The filtering module 124 is arranged to intercept and filter at least one of the data access requests that are addressed to the server 122.

The filtering module 124 identifies, based on a received e.g., user name and/or a client device ID(s), a corresponding client registered at the server 122 side.

Optionally, the filtering module 124 verifies whether the concerned client has or has not the right entitlement(s) to access requested data at least in part. If the concerned client has not the right entitlement(s) to access any of requested data, then the filtering module 124 blocks the intercepted data access request by not transmitting this latter to the server 122. Otherwise, i.e. if the concerned client has the right entitlement(s) to access at least a requested part of the requested data, the filtering module 124 transmits the intercepted data access request possibly in a modified manner to the server 122. Such a data access request modification depends on at least the client and possibly its/her/his entitlement(s) and/or environmental conditions, like e.g., a location of the concerned client, a date and time of the concerned data access request, a frequency of previous data access requests, an history of data access requests.

The filtering module 124 may be connected, through a bi-directional wire or wireless link 15, to the first entity(ies) 16 that may provide one or several first services. The filtering module 124 is preferably able to collect context data, like e.g., a date and time, and/or other relevant data from the first entity(ies) 16 that may be required for accessing a service(s) provided by the server 122.

The filtering module 124 filters (or not), based on the or each concerned client, the or each (corresponding) data access request, i.e. provides (or not) the server 122 with the concerned data access request, according to the or each concerned client. The or each data access request may include or be accompanied with one or several context elements. The context elements may be provided by the client device, one or several devices connected to the client device and/or the first entity(ies) 16. The filtering module 124 is configured to filter a part or all of the data access requests that are intended to the server 122 by extracting one or several context elements included in the or each data access request.

According to an essential invention feature, the system 12 includes a (response) adapting module 126.

The adapting module 126 may be present in a location that is separate from a location of the server 122.

The adapting module 126 may be present in a location that is separate from a location of the filtering module 124.

The adapting module 126 is configured to intercept the (original) response to a corresponding data access request that is received by the server 122. The response originates from the server 122 and is captured by the adapting module 126. The response includes original data.

The adapting module 126 may be connected, through a bi-directional wire or wireless link 17, to the second entity(ies) 18 that may provide one or several second services. The adapting module 126 is preferably able to collect context data, like e.g., a date and time, and/or other relevant data, from the second entity(ies) 18 that may be required for accessing a service(s) provided by the server 122.

The adapting module 126 is preferably connected to the filtering module 124, so as to retrieve one or several context data elements, such as specific data defined in the client entitlement for the service(s) provided by the server 122, outside or external data, like e.g., a date and time, an history of the received data access requests, and/or other data relevant for the service(s) provided by the server 122.

The adapting module 126 adapts the intercepted (original) response while being specific to the concerned client.

The intercepted response constitutes a basis for an adaptation to all the clients which request the data response.

The adapting module 126 provides an adapted response.

The adapted response may include at least in part the (original) response or the (original) response that has been previously modified and/or measured (by the adapting module 126) in a manner dependent on at least the client.

The adapting module 126 is preferably configured to:
separate, based on at least the client, the intercepted response into one or several data elements;
select, based on at least the client, a predetermined client entitlement; and
generate, based on at least the client and the predetermined client entitlement, one or several values relating to the data element(s).

To generate the value(s) relating to the data element(s), the adapting module 126 uses one or several predetermined data element modifying schemes and/or one or several predetermined data element measuring schemes.

The response modification(s) may consist notably in stripping one or several non-licensed data elements, modifying the response granularity by giving less precision), changing the response representation, limiting and/or anonymizing one or several response data elements, according to the predetermined data element modifying scheme(s).

Each (predetermined) data element modifying scheme comprises a predetermined algorithm for processing the concerned data element.

The adapting module 126 accesses a or the client database that associates with one or several clients, for each client, the predetermined data element modifying scheme(s) that allow(s) to determine how to modify each concerned data element of a response provided by the server 122. Such a data element modifying scheme(s) allow(s) the adapting module 126 to provide a corresponding adapted response.

The adapting module 126 accesses a or the client database that associates with one or several clients, for each client, the predetermined data element measuring scheme(s) (or model(s)) that allow(s) to determine how to measure each concerned data element of the adapted response to be provided by the system 12. Such a data element measuring scheme(s) may depend on, besides the concerned client, the corresponding data access request, the context data and/or the data element(s) to be comprised in the adapted response. Such a data element measuring scheme(s) allow(s) the adapting module 126 to provide a corresponding adapted response that includes one or several measured values relating to the data element(s) comprised within the adapted response.

The adapting module 126 provides a (resulting) response that is adapted to the concerned client, as a client adapted response. Two or more client adapted responses that are issued by the adapting module 126 may be different for respective different clients while being only processed by the adapting module 126.

The adapting module 126 is preferably caching each already processed data access request along with the corresponding (original) response originating from the server 122. As known per se, a cache is a hardware or software component that stores data, namely the data access request along with the server 122 response, so that a future same data access request (for that data) can be served faster as the call to the server 122 can be omitted, i.e. avoided. Such a cached response can be used irrespective of the client, as the basis for calculating or determining the adapted response. Such an ability to cache an (original) data response(s) allows limiting the processing time of the server 122 sending back the data response(s) needed by all of the corresponding clients and answering to the corresponding (single) data access request. Such a data response cache ability reduces the processing time of the server 122 and increases therefore its performances.

Alternatively, the adapted response can be stored in the cache as the result of an earlier processing of a previous data access request and used as a response to the data access request of the same (previous) client. Such a data caching allows the adapting module 126 to enable an efficient use of a previously stored adapted response(s) that result(s) from a previous processing of a corresponding data access request(s). The stored adapted response may be thus re-used in a cost effective manner. The cache may be integrated in the server 122 or the client database or close to the filtering module 124 and/or the adapting module 126.

The adapting module 126 may use a predetermined response measuring scheme. The (resulting) adapted response includes advantageously one or several generated values relating to the adapted response. The adapted response is not modified per se and remains (or corresponds to) original data included in the response issued by the server 122.

A part or all of the adapted response replaces preferably the response that is sent by the server 122 to the PC 14.

The adapted response includes preferably the generated value(s) relating to the data element(s) (that have been separated from the intercepted response by the adapting module 126).

The generated value(s) relating to the data element(s) may include generated data representing a monetary value relating to the adapted response based on the predetermined data element measuring scheme(s). The adapted response includes the generated data representing the monetary value relating to the adapted response.

The generated value(s) relating to the data element(s) depend(s) on data originating from the server 122, the client, the PC 14 and/or one or several other devices, such as the first entity(ies) 16 and/or the second entity(ies) 18.

The generated value(s) relating to the data element(s) (split from the (original) intercepted response by the adapting module 126) replace(s) preferably an original value in the response that should have been sent to the PC 14 by the server 122.

The system 12 is adapted to control access to data requested by a registered client while providing the adapted response that results from an analysis and a processing of the intercepted (original) response according to the client.

The system 12 further comprises means for sending a part or all of the adapted response to the PC 14 or one or several other devices that are identified by the first entity(ies) 16, the second entity(ies) 18 or that are identified within a (or the) database accessible from the system 12, i.e. stored internally or externally to the system 12.

The system 12 can be a system where the filtering module 124, the adapting module 126, the first entity(ies) 16 and/or the second entities 18 are on the same machine (or device) or on different machines (or devices) potentially distributed across multiple sites, allowing thus a processing dislocated from the server 122.

In another embodiment, the adapting module 126 is located, at least in part, within the server 122 while being integrated in the data flow from response processing to sending the data to the PC 14.

The system 12 is connected or communicatively coupled, via a bi-directional wire or wireless link 17, to the second entity(ies) 18, so as to provide the PC 14 with a part or all of the adapted response. The second entity(ies) 18 may be operated at least in part by a service operator(s) or on its(their) behalf.

The system 12 is connected or communicatively coupled, via a wire or wireless link 19, to the PC 14, so as to provide the PC 14 with a part or all of the adapted response.

Figure 2:
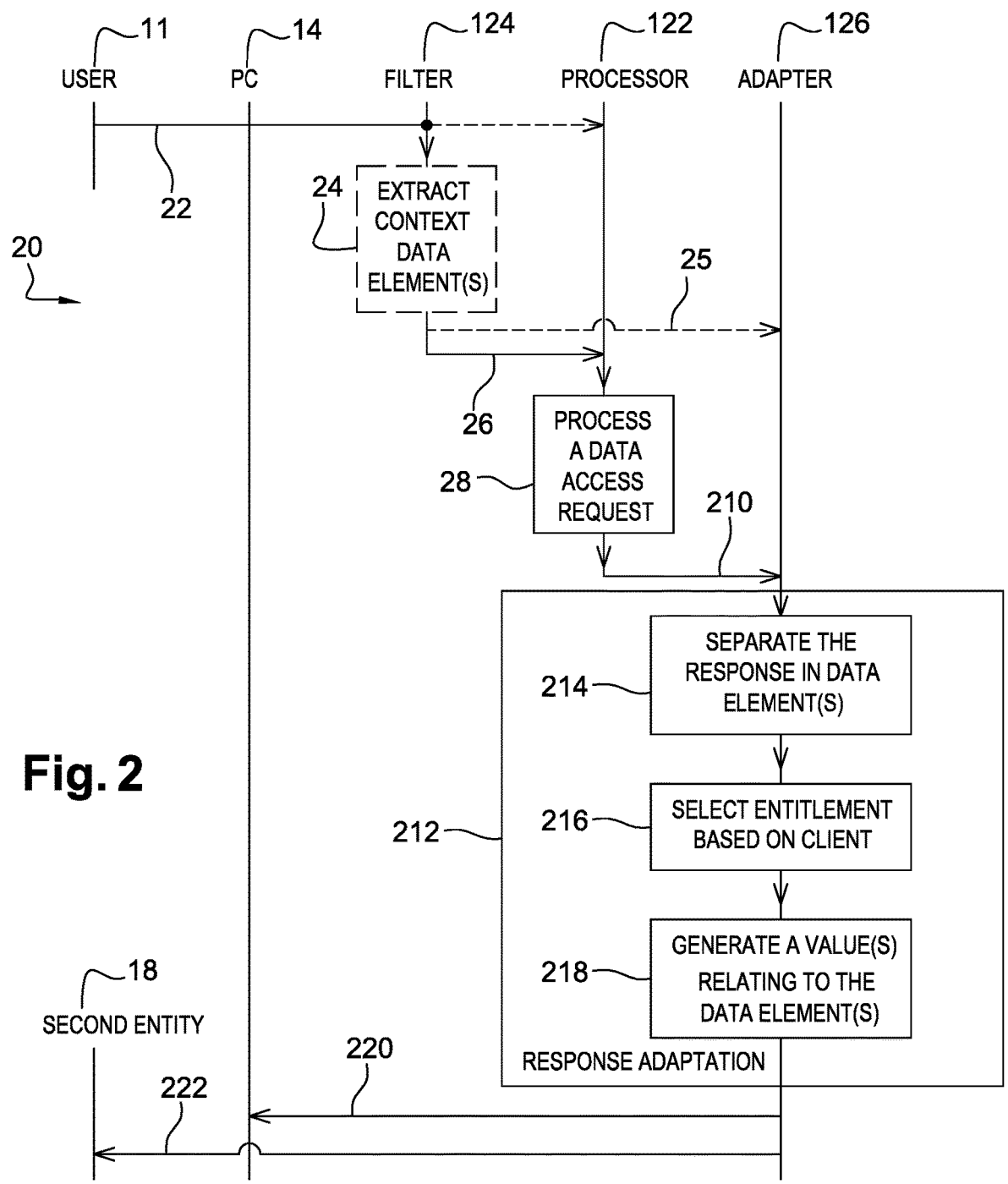
FIG. 2 represents an example of a flow of messages exchanged between the PC, the server and the module of the system of FIG. 1, so that the system identifies the client, determines, based on the client, an adapted response and sends a part or all of data elements comprised within the adapted response to the PC and/or (an)other device(s).

FIG. 2 depicts an example of a message flow 20 that involves the user 11, the PC 14, the filtering module 124, the server 122 and the adapting module 126, so that the system 12 controls, on a basis of the requesting client, access to (requested) data.

It is assumed that the server 122 has previously registered (not represented) the user 11 ID, as client ID.

The user 11 launches a client application (or the like) supported by the PC 14 while using an MMI that is included in or connected to the PC 14.

Alternately, an execution of the client application supported by the PC 14 is automatically launched (i.e. without any involvement of the user 11) (not represented).

The user 11 enters or selects preferably data to be requested while using the PC MMI (or an external MMI connected or communicatively coupled to the PC 14).

Further to an initiative of the user 11 (when applicable), the PC 14 sends to the server 122 a data access request 22. The data access request 22 includes her/his user name, as a client ID, and a predefined API (or SPI) that is associated with the server 122. The data access request may include one or several context data elements that are locally collected e.g. through one or several sensors (not represented) connected or communicatively coupled to the PC 14.

The filtering module 124 intercepts preferably the data access request 22 addressed to the server 122.

The filtering module 124 identifies (not represented), based on the client ID, the concerned client.

The client ID may be derived from an access token, like e.g., an access token used by an OAuth process.

The filtering module 124 may receive context data from the first entity(ies) 16 (not represented).

Optionally, the filtering module 124 extracts 24 one or several context data elements from data that is previously collected by the filtering module 124 possibly through the data access request originating from the PC 14 and/or the first entity(ies) 16.

Optionally, the filtering module 124 sends to the adapting module 126 the data access request including and/or being accompanied with one or several possibly extracted context data elements 25.

The filtering module 124 sends to the server 122 the (received) data access request 26.

The server 122 processes 28 the (received) data access request while executing one or several applications supported by the server 122. As data access request processing result, the server 122 provides or generates a corresponding (original) response.

Once the server 122 has generated the response, the server 122 sends the response 210 to the PC 14.

The adapting module 126 intercepts the response addressed to the PC 14.

The adapting module 126 adapts 212 the (intercepted) response while remaining specific to the concerned client and provides or generates a corresponding adapted response.

To adapt the response, the adapting module 126 separates 214 preferably, based on the (identified) client, the intercepted response into a data element(s).

The adapting module 126 selects 216, based on the client, an associated (predetermined) client entitlement.

The adapting module 126 generates 218, based on the client and the associated client entitlement, one or several values relating to the (separated) data element(s).

To generate the value(s) relating to the data element(s), the adapting module 126 may use one or several predefined data element modifying schemes and/or one or several predefined data element measuring schemes.

The adapted response includes the thus generated value(s) relating to the data element(s).

The thus generated value(s) relating to the data element(s) may include a monetary value relating to the adapted response. The adapted response includes the generated monetary value relating to the adapted response.

The adapted response may be not modified per se, i.e. the (original) intercepted response is kept. In such a scenario, the adapted module 126 uses a predetermined response measuring scheme. The adapted response includes the thus generated value relating to the adapted response, as a monetary value relating to the adapted response.

The adapting module 126 stores (not represented), preferably in a cache memory, the data access request in association with the (original) response originating from the server 122. Thus, in case of a reception of a future same data access request, the filtering module 124 bypasses the server 122 request and the adapting module 126 is arranged to retrieve quickly and efficiently a corresponding (original) response without needing to wait for a re-processing of the data access request by the server 122.

The adapting module 126 sends preferably to the PC 14 a part (or all) of the adapted response 220, such as, in a first scenario, a modified response (with respect to the (original) response generated by the server 122) or, in a second scenario, a non-modified response (with respect to the (original) response generated by the server 122).

The adapting module 126 sends preferably to the second entity(ies) 18 a possible complementary part (or all) of the adapted response 222, such as, in the first scenario, the measured value relating to the modified response or, in the second scenario, the monetary value relating to the non-modified response.

The invention solution can thus measure, in a flexible manner, a value provided to a client either be based on the data access request and response or any third party system to feed or provide a (granular) value, i.e. a more or less great value.

The invention solution allows the response measurement not to be dependent on a counting of the number of API (endpoint) requests only.

The invention solution allows providing a plurality of responses that are adapted to their respective clients without needing to modify the concerned service and the associated API or SPI.

The embodiment that has just been described is not intended to limit the scope of the concerned invention. Other embodiments may be given. As another embodiment, instead of using two remote devices, namely a client device and a server, two local devices implement the claimed invention method.

The invention claimed is:

1. A system for adapting a response provided by a first device, wherein
the system comprises the first device;
the first device comprises a processor;
the processor is configured to:
  receive, from at least one user device, as at least one second device, a data access request, the data access request comprising at least one identifier relating to a user and a predetermined application programming interface or a predetermined service provider interface, the application programming interface or the service provider interface being associated with the first device;
  process the data access request and provide an original data response to the data access request; and
  send the original data response;
wherein the system is configured to:
  intercept, by a secure element connected to the first device, the original data response sent by the first device;
  modify the original data response while being specific to the user by:
    separating, based on the user, the intercepted original data response into a plurality of data elements;
    selecting, based on the user, a predetermined user entitlement, wherein the predetermined user entitlement includes one or several allowed data operations that follow (i) a data reading at least in part, (ii) a data update at least in part, and (iii) a data sharing at least in part;
    generating, based on the user and the selected user entitlement, at least one value relating to each of the separated data elements, each of these values relating to each of the separated data elements include generated data representing a monetary value relating to the adapted response based on at least one predetermined data element measuring scheme, wherein the monetary value is the perceived business value for the client; and
    replacing an original value included in the intercepted original data response with said generated at least one value,
  wherein response modifications include at least one of (i) stripping one or several non-licensed data elements from the separated data elements, (ii) modifying a response granularity, (iii) changing a response representation, and (iv) anonymizing one or several response data elements of the plurality of data elements;
  provide an adapted response including the at least one generated value representing the monetary value relating to the plurality of data elements that have been separated from the intercepted response; and
  send at least a part of the adapted response to the second device or at least one third device.

2. System according to claim 1, wherein the data access request includes at least one context data element, and the system is configured to intercept and filter the data access request addressed to the first device and extract the at least one context data element.

3. System according to claim 1, wherein, to generate the at least one value relating to each of the separated data elements, the system uses at least one predetermined data element modifying scheme and the at least one predetermined data element measuring scheme.

4. System according to claim 3, wherein the original data response comprises original data, and each of the at least one predetermined data element modifying scheme comprises a predetermined algorithm for processing the data element.

5. System according to claim 3, wherein the at least one generated value relating to each of the separated data elements depends on at least one element of a group comprising:
  data originating from the first device, the second device or at least one third device and the user.

6. System according to claim 1, wherein the system uses at least one predetermined data element modifying scheme.

7. System according to claim 1, wherein the adapted response includes the intercepted original data response and the generated value relating to each of the separated data elements, the system using a predetermined response measuring scheme.

8. A method for adapting a response provided by a first device, comprising:
- receiving, by the first device, from at least one user device, as at least one second device, a data access request, the data access request comprising at least one identifier relating to a user and a predetermined application programming interface or a predetermined service provider interface, the predetermined application programming interface or the predetermined service provider interface being associated with the first device;
- processing, by the first device, the data access request;
- providing, by the first device, an original data response to the data access request;
- sending, by the first device, the original data response;
- intercepting, by a secure element connected to the first device, the original data response sent by the first device;
- modifying the original data response while being specific to the user by
  - separating, based on the user, the intercepted original data response into a plurality of data elements;
  - selecting, based on the user, a predetermined user entitlement, wherein the predetermined user entitlement includes one or several allowed data operations that follow (i) a data reading at least in part, (ii) a data update at least in part, and (iii) a data sharing at least in part;
  - generating, based on the user and the selected user entitlement, at least one value relating to each of the separated data elements, each of these values relating to each of the separated data elements include generated data representing a monetary value relating to the adapted response based on at least one predetermined data element measuring scheme, wherein the monetary value is the perceived business value for the client; and
  - replacing an original value included in the intercepted original data response with said generated at least one value,
- wherein response modifications include at least one of (i) stripping one or several non-licensed data elements from the separated data elements, (ii) modifying a response granularity, (iii) changing a response representation, and (iv) anonymizing one or several response data elements of the plurality of data elements;
- providing an adapted response including the at least one generated value representing the monetary value relating to the plurality of data elements that have been separated from the intercepted response; and
- sending at least a part of the adapted response to the second device or at least one third device.

9. System according to claim 1, wherein the adapted response further includes at least one data element from the plurality of data elements.

10. System according to claim 1, wherein the monetary value is related to money.

11. Method according to claim 1, wherein the monetary value is related to money.

* * * * *